United States Patent [19]
Beurrier

[11] 3,789,315

[45] Jan. 29, 1974

[54] HYBRID COUPLERS

[75] Inventor: Henry Richard Beurrier, Chester Twp., Morris County, N.J.

[73] Assignee: Bell Telephone Laboratories, Incorporated, Murray Hill, N.J.

[22] Filed: Aug. 1, 1972

[21] Appl. No.: 276,912

[52] U.S. Cl. .................................. 330/185, 330/53

[51] Int. Cl. .............................................. H03f 1/00

[58] Field of Search ........... 330/53, 185, 167, 11, 8; 333/10

[56] References Cited

UNITED STATES PATENTS 3,244,998 4/1966 Broadhead, Jr. .................. 330/53 X 3,488,601 1/1970 Rosenblat .............................. 330/8

*Primary Examiner*—Nathan Kaufman

*Attorney, Agent, or Firm*—S. Sherman

[57] ABSTRACT

Two, high frequency, broadband hybrid couplers are disclosed. The first comprises three identical coils wound on a common magnetic core. The second comprises two identical 1:1 turns ratio transformers. A coupler is realized by the particular manner in which the windings are connected.

7 Claims, 9 Drawing Figures

HYBRID COUPLERS

This application relates to hybrid couplers for use with dual active stages.

BACKGROUND OF THE INVENTION

In the copending application by H. Seidel, Serial No. 204,804, filed December 6, 1971, and assigned to applicant's assignee, there is described a class of amplifiers employing dual active stages connected between a pair of hybrid couplers. In theory, any in-phase hybrid coupler could be used with such amplifiers. As a practical matter, however, for amplifiers intended to operate over broad frequency bands in the megahertz range, the coupler transformers must be very carefully designed if the resulting coupler is to retain its power dividing characteristic over the entire band of interest.

As noted in applicant's copending application Ser. No. 223,117, filed Feb. 3, 1972, and assigned to applicant's assignee, the passband of a transformer is limited at the lower end of the band by the self-inductance of its windings, and at the higher end of the band by its parasitic interwinding capacitance and its leakage inductance. In applicant's copending application these conflicting effects are minimized by physically separating the several windings along different sections of a common magnetic core. This technique, while effective, typically requires added windings and, in many cases, coupling capacitors. In addition, the fabrication of such transformers is more expensive as there are added steps involved in placing the several windings along the different portions of the magnetic core.

SUMMARY OF THE INVENTION

In a broadband hybrid coupler, in accordance with the present invention, the deleterious effects of spurious interwinding capacitance are reduced by reducing the number of windings in the coupler and/or by the manner in which the windings are interconnected. A first embodiment comprises three identical windings wound on a common magnetic core. Opposite ends of a first of said three windings constitute the first and second coupler ports. One end of the second of the windings constitutes a third coupler port. The other end of the second winding, and one end of the third winding are connected to a common junction to form a series-aiding connection. The other end of the third winding is grounded. A matching impedance is connected between the common junction and one end of the first winding.

A coupler in accordance with a second embodiment of the invention comprises two, 1:1 turns ratio transformers. Adjacent ends of the windings of one of said transformers are connected, respectively, to the adjacent ends of the other of said transformers, forming first and second coupler ports. The other end of one winding of each transformer is connected to a common junction. One of the remaining other ends constitutes a third coupler port while the remaining winding end is grounded. A matching impedance is connected between the common junction and the second of said ports.

The above-described couplers are designed to be terminated by means of dual impedances and, as such, are particularly adapted for use with amplifiers of the type described in the above-identified application by Seidel. Examples of such use is illustrated.

It is an advantage of the present invention that high frequency broadband couplers are realized by means of simple transformers. Of particular interest in this connection are couplers that span the band between 5 and 150 megahertz.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
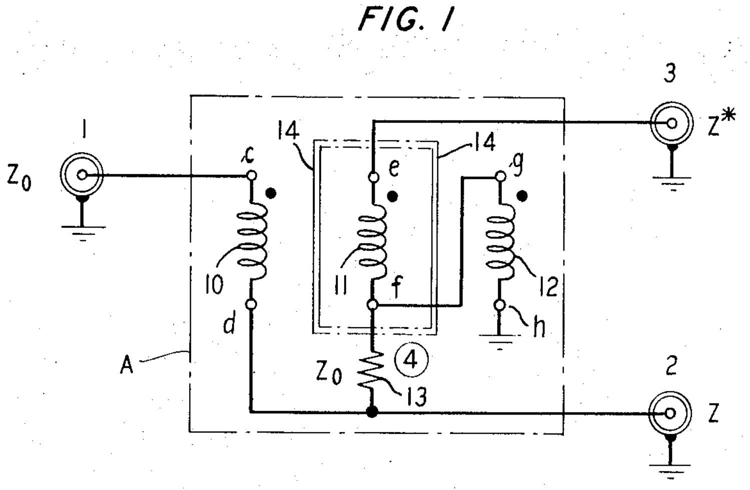
FIG. 1 shows a first embodiment of a hybrid coupler in accordance with the present invention.

Referring to the drawings, FIG. 1 shows a hybrid coupler A, in accordance with a first embodiment of the present invention, comprising three identical windings 10, 11 and 12 wound on a common magnetic core 14. The three windings can be separately wound along different portions of the core or, advantageously, can be wound as a trifilar winding for tightest coupling.

Designating the winding ends as *c-d*, *e-f* and *g-h*, end *c* of winding 10 constitutes one of the coupler ports 1. The opposite end *d* of winding 10 constitutes a second coupler port 2. End *f* of winding 11 is conductively connected to the opposite end *g* of winding 12 to form a series-aiding connection of windings 11 and 12. End *h* of winding 12 is grounded. End *e* of winding 11 constitutes a third coupler port 3 which with port 2 form one pair of conjugate ports 2–3 of the coupler. The fourth port, designated ④, is embedded within the internal structure of the network, and is evidenced by the terminating impedance 13 connected between end *f* of winding 11 and end *d* of winding 10.

Coupler A is matched with respect to all ports when port 1 is terminated by means of an impedance $Z_o$ equal to the impedance of termination 13, and ports 2 and 3 are terminated by means of dual impedances Z and Z*, respectively, where $$Z = \frac{1}{2} Z_o \tag{1}$$

and $$Z^* = 2Z_o \tag{2}$$

For this special case, all of the input signal power applied to port 1 is delivered to the two loads Z and Z* and divided equally between them.

More generally, the coupler is matched with respect to input port 1 so long as loads Z and Z* are dual. That is, so long as $$ZZ^* = Z_o^2 \quad (3)$$

and $$Z < Z^* \quad (4)$$

In this more general case, the input power is divided unequally between the two loads. Reflected signals, due to the mismatch at ports 2 and 3, are absorbed in termination 13.

Of particular interest is the case when Z* is an open circuit, and Z is a short circuit. In this case, to be considered in greater detail hereinbelow, a signal source connected to port 1 will produce a voltage 2V at port 3, and a current 2I at port 2, where V, the input voltage at port 1, is given by $$V = IZ_o\ . \quad (5)$$

Figure 2A:
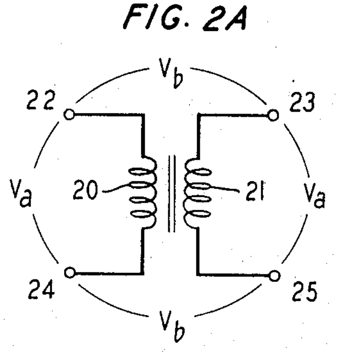
FIGS. 2A and 2B, included for purposes of explanation, illustrate certain properties of tightly coupled 1:1 turns ratio transformers.
Figure 3:
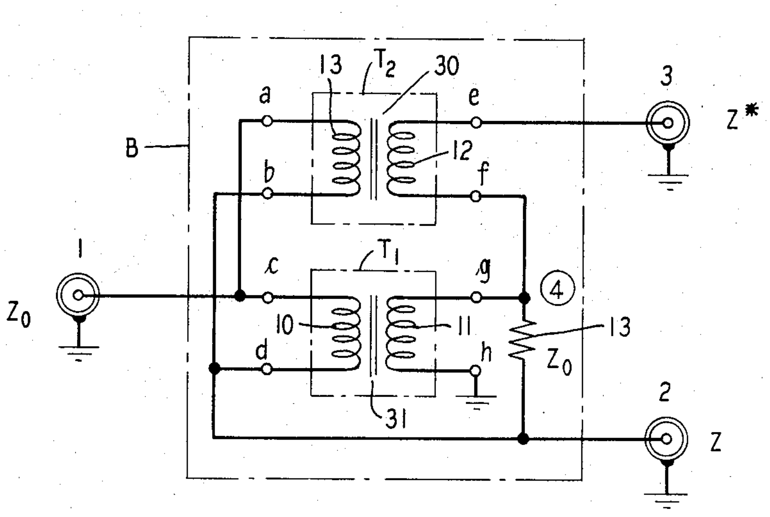
FIGS. 3 and 4 show two modifications of the embodiment of FIG. 1.
Figure 4:
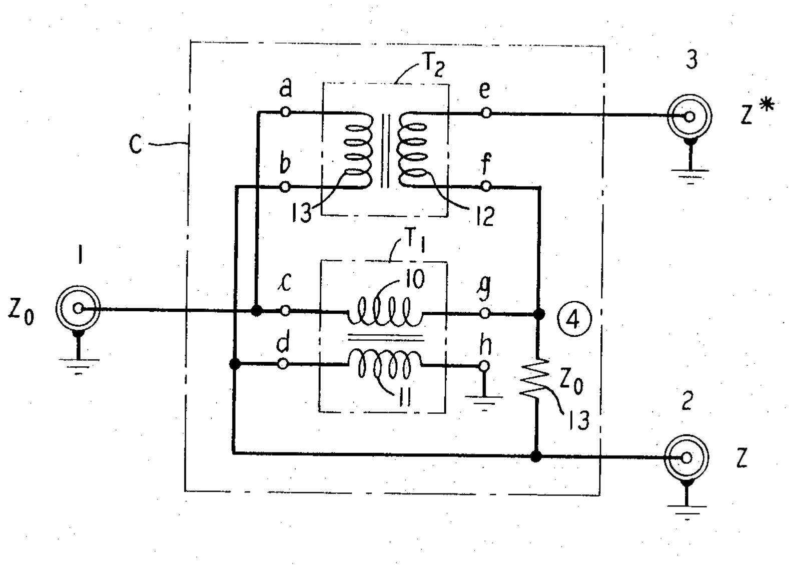
Figure 5:
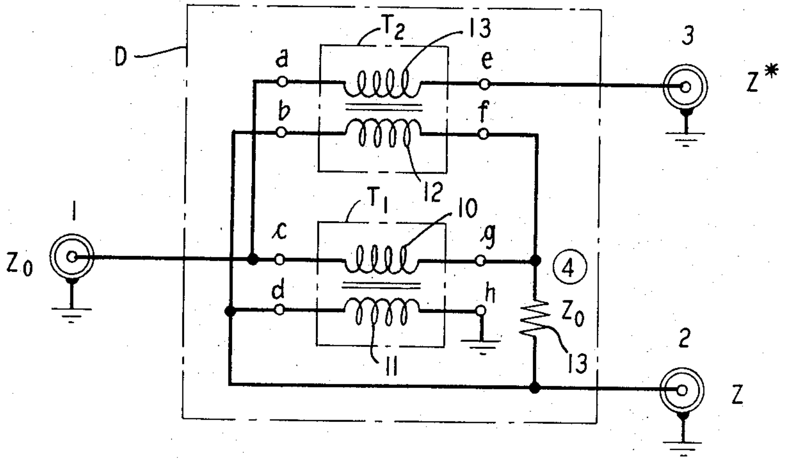
FIG. 5 shows a second, preferred embodiment of the invention.

FIGS. 3 and 4, now to be considered, illustrate a number of modifications of coupler A, leading to a second embodiment of interest, illustrated in FIG. 5. These modifications are more readily understood, however, by first noting some properties of a transformer as illustrated in FIG. 2A. This figure shows a simple 1:1 turns ratio transformer including windings 20 and 21. It is among the basic properties of a tightly coupled 1:1 turns ratio transformer that a voltage $V_a$ applied between terminals 22 and 24 of winding 20 will produce a voltage $V_a$ between terminals 23 and 25 of winding 21. Similarly, a voltage $V_b$ applied between terminals 22 and 23 of windings 20 and 21 will produce a voltage $V_b$ between the opposite terminals 24 and 25. Thus, the transformer terminals can be regarded as constituting two coupled pairs, one of which pair consists of terminals 22–24 and 23–25, and the second of which consists of terminals 22–23 and 24–25.

Figure 2B:
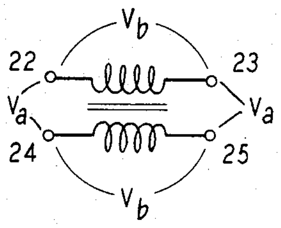

If now the windings are rotated 90 degrees so that winding 21 extends between terminals 22 and 23, and winding 20 extends between terminals 24 and 25, we obtain the transformer shown in FIG. 2B. If, as was done previously, a voltage $V_a$ is applied between terminals 22 and 24, an equal voltage $V_a$ will appear between terminals 23 and 25. Likewise, a voltage $V_b$ applied between terminals 22 and 23 will produce an equal voltage $V_b$ between terminals 24 and 25. Thus, the coupled terminal pairs for the two transformers are precisely the same. That is, with respect to the external terminals of the transformer, there is no difference when the transformer windings are rotated 90° relative to said terminals. This property of a tightly coupled transformer will now be applied to coupler A of FIG. 1 to derive the second embodiment of the invention.

In the first modification of coupler A, illustrated in FIG. 3, the common core 14 is replaced by two separate magnetic cores 30 and 31. Windings 10 and 11 are wound on one of the cores 31 to form a first 1:1 turns ratio transformer $T_1$. The third winding 12 is wound on the second core 30 along with a fourth winding 13 to form a second 1:1 turns ratio transformer $T_2$. Since winding 12 is no longer wound on the same core as windings 10 and 11, the required coupling is now provided by the fourth winding 13, which is connected in parallel with winding 10. With respect to the external ports 1, 2 and 3, however, the resulting coupler B, illustrated in FIG. 3, operates, in all respects, the same as coupler A.

In FIG. 4, the windings of transformer $T_1$ are rotated 90°. As a result, winding 10 is connected between terminals c-g, and winding 11 is connected between terminals *d-h*. Since, as explained hereinabove, in connection with FIGS. 2A and 2B, the two transformer configurations are equivalent, coupler C, illustrated in FIG. 4, is also the equivalent of coupler A.

In the embodiment of coupler D, shown in FIG. 5, the windings of transformer $T_2$ are similarly rotated 90 degrees so that winding 13 is not connected between terminals *a-e*, and winding 12 is now connected between terminals *b-f*. In all other respects, however, coupler D is the equivalent of coupler C and, hence, of coupler A.

Figure 6:
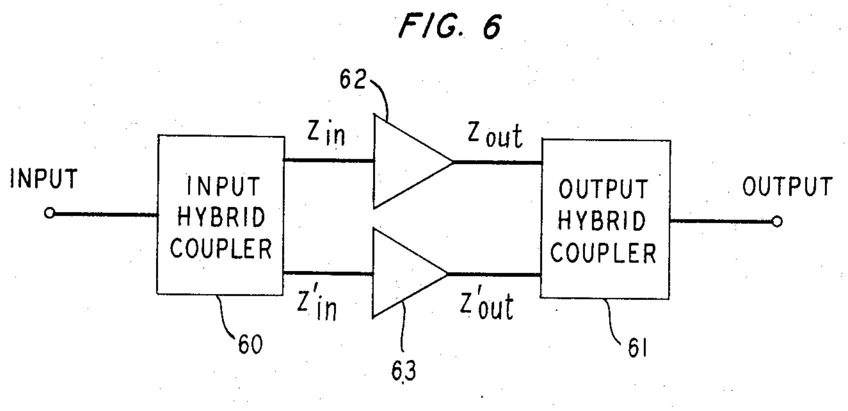
FIG. 6 shows, in block diagram, a class of amplifiers using two hybrid couplers.

Couplers of the type described hereinabove are of particular interest in connection with the hybrid coupled amplifiers described in the above-identified Seidel application. Basically, such amplifiers include, as illustrated in FIG. 6, a pair of hybrid couplers 60 and 61 connected by means of a pair of active stages 62 and 63, where the respective input and output impedances of the two stages are mutually dual. That is, with respect to some reference impedance $Z_o$, the input impedances $Z_{in}$ and $Z'_{in}$, and the output impedance $Z_{out}$ and $Z'_{out}$ for the two stages are related by $$Z_{in}Z'_{in} = Z_o^2 \quad (6)$$

and $$Z_{out}Z'_{out} = Z_o^2\ . \quad (7)$$

Figure 7:
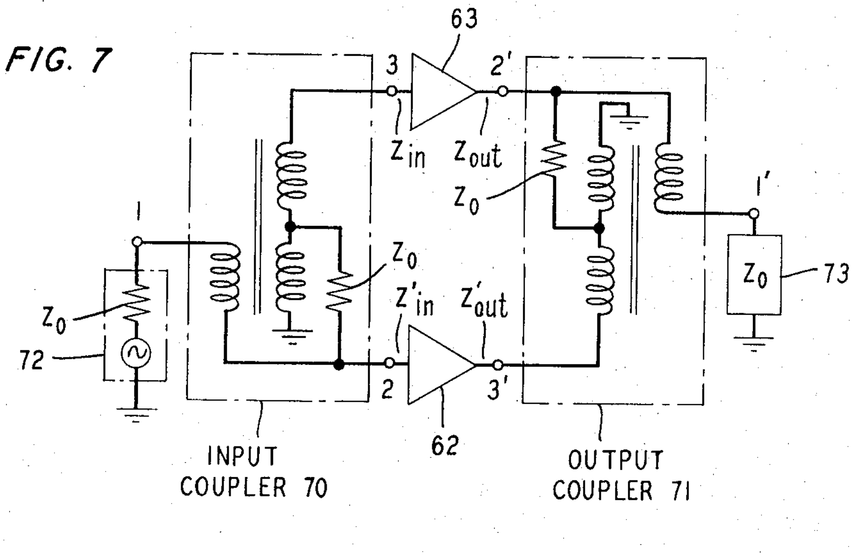
FIG. 7 shows an amplifier of the class shown in FIG. 6, using two couplers of the type illustrated in FIG. 1.

Thus, with respect to this class of amplifiers, any of the several couplers illustrated, or combinations thereof, can be used as the input coupler 60 and the output coupler 61. As an example, FIG. 7 shows an amplifier comprising an input coupler 70 and an output coupler 71 of the type shown in FIG. 1, connected by means of dual amplifiers 62 and 63. Terminal 1 of coupler 60 is connected to a signal source 72, having an output impedance $Z_o$. Terminals 2 and 3 are connected, respectively, to the input ends of active stages 62 and 63. Terminal 1' of output coupler 71 is connected to an output load 73 of impedance $Z_o$, while terminals 2' and 3' are connected, respectively, to the output ends of active stages 63 and 62. In this particular configuration it is assumed that $Z_{in} > Z'_{in}$ and $Z'_{out} > Z_{out}$.

Figure 8:
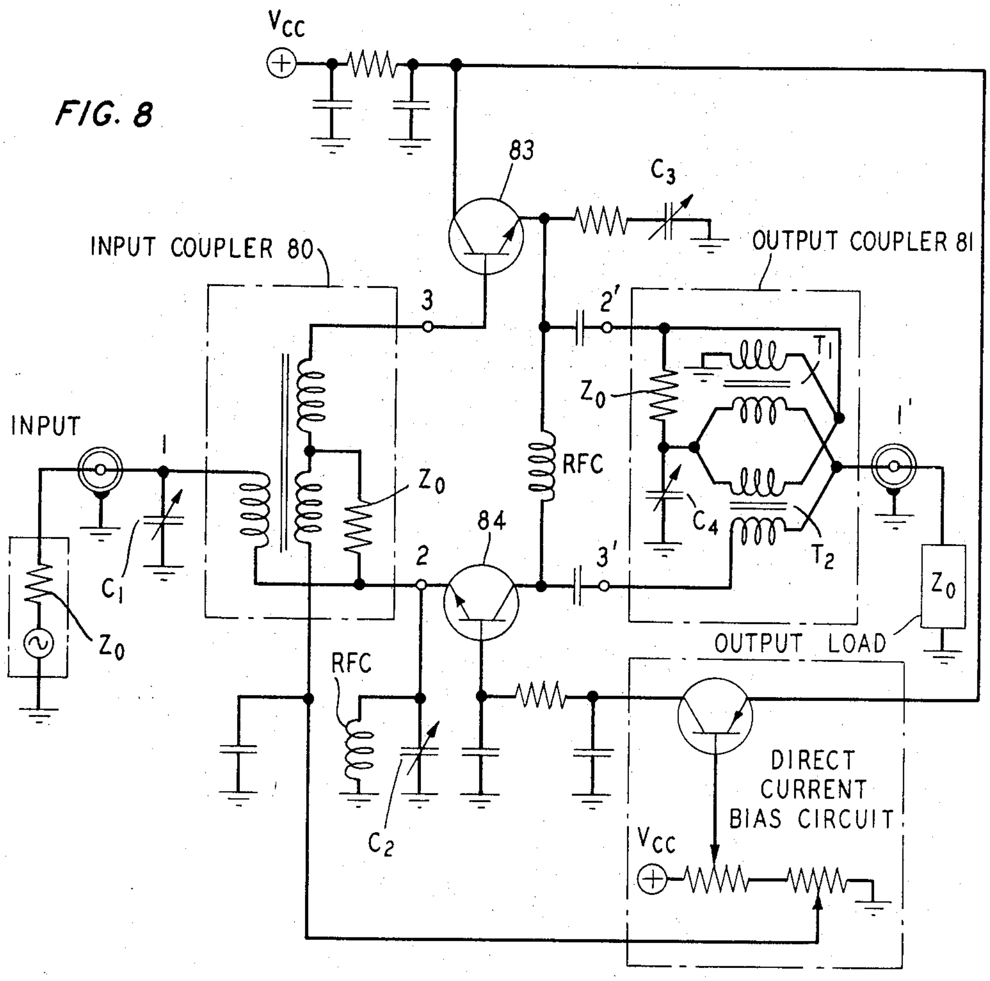
FIG. 8 shows an amplifier of the class shown in FIG. 6 using a coupler of the type illustrated in FIG. 1 as an input coupler, and a coupler of the type illustrated in FIG. 5 as an output coupler.

As discussed hereinabove, one of the advantages of the couplers shown in FIGS. 1, 3, 4 and 5 resides in their broadband capabilities. However, because of the uncertain nature of the parasitics encountered in the various coupler configurations, and in the active stages, it is not always possible to predict with certainty, which of the particular coupler configurations will be best in a specific case. However, excellent results have been obtained using coupler A as the input coupler and coupler D as the output coupler. In particular, these were used in connection with an amplifier using two transistor stages, as illustrated in FIG. 8. Specifically, one of the transistors 83 is connected in the common collector configuration wherein its base electrode is connected to port 3 of input coupler 80 and its emitter electrode is connected to port 2' of output coupler 81. The collector electrode is grounded with respect to the signal.

The other transistor 84 is connected in the common base configuration wherein its emitter electrode is connected to port 2 of coupler 80 and its collector electrode is connected to port 3' of coupler 81. The base electrode is grounded with respect to the signal. It will be noted that input coupler 80 is a type A coupler and output coupler 81 is a type D coupler. Also shown are the direct current bias circuits and trimmer capacitors $C_2$ and $C_3$.

Input coupler 80 is constructed of six trifilar turns, wound on a General Ceramics CF121 – "H" core. Each conductor was a quadruple coated Teflon, No. 30 AWG wire. The three wires were twisted together forming a helix with a pitch of between 4–6 turns per inch. Each of the transformers $T_1$ and $T_2$ of output coupler 81 comprises six bifilar turns wound the same type core, and made of the same wire as input coupler 80.

The transistors 83 and 84 were Western Electric type A2737 transistors.

This amplifier, designed to operate over the band between 5 and 150 $MH_z$ had the following characteristics:

| | | |
|---|---|---|
| Frequency response | 2–180 $MH_z$ | ±0.1 db |
| Input return loss | ( 5–120 $MH_z$ | ⩾ 20 db |
| | (120–140 $MH_z$ | ⩾ 10 db |
| Output return loss | 5–170 $MH_z$ | ⩾ 20 db |
| Average Gain | 11.1 db | |
| DC bias | | |
| Transistor **83**, $V_{CE}$ = 9.7 v. at 122 ma. | | |
| Transistor **84**, $V_{CE}$ = 13.9 v. at 104 ma. | | |

Third order intermodulation, $M_3$, measured by means of 3, 10 dbm tones at about 140 $MH_z$ = 82 db.

Transformers $T_1$ and $T_2$ can, alternatively, be made of sections of transmission line of characteristic impedance $2Z_0$. Thus, in all cases it is understood that the above-described arrangements are illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. A hybrid coupler comprising:
- three identical windings magnetically coupled to each other;
- the two ends of a first of said windings constituting, respectively, a first port and a second port of said coupler;
- means for series-connecting the other two of said windings series-aiding;
- one end of said series-connected windings being grounded;
- the other end of said series-connected windings constituting a third coupler port;
- and a terminating impedance connected between the junction of said two windings and said second coupler port.

2. The coupler according to claim 1 wherein said three windings are wound on a common magnetic core.

3. The coupler according to claim 1 wherein said three windings are trifilar wound.

4. A hybrid coupler comprising:
- a pair of 1:1 turns ratio transformers, one of which has four terminals *a*, *b*, *e* and *f*, of which *a-b* and *e-f* constitute a coupled pair, and the other of which has four terminals *c*, *d*, *g* and *h*, of which *c-d* and *g-h* constitute a coupled pair;
- means for connecting terminal *a* of said one transformer to terminal *c* of said other transformer, forming a first port of said coupler;
- means for connecting terminal *b* of said one transformer to terminal *d* of said other transformer forming a second port of said coupler;
- means for connecting terminal *f* of said one transformer to terminal *g* of said other transformer;
- terminal *e* of said one transformer constituting a third coupler port;
- terminal *h* of said other transformer being grounded;
- and a terminating impedance connected between the junction of terminals *g* and *f* and said second coupler port.

5. The coupler according to claim 4 wherein said 2 transformers comprise lengths of transmission line.

6. An amplifier comprising:
- an input coupler and an output coupler, each in accordance with claim 1;
- a first signal amplifying stage connected between the third port of said input coupler and the second port of said output coupler;
- a second signal amplifying stage connected between the second port of said input coupler and the third port of said output coupler;
- the first port of said input coupler being the input port of said amplifier;
- and the first port of said output coupler being the output port of said amplifier.

7. An amplifier including:
- an input coupler comprising:
  - three identical windings magnetically coupled to each other;
  - the two ends of a first of said windings constituting, respectively, port 1 and port 2 of said coupler;
- means for series-connecting the other two of said windings series-aiding;
- one end of said series-connected windings being grounded;
- the other end of said series-connected windings constituting coupler port 3;
- and a terminating impedance connected between the junction of said two windings and coupler port 2;
- an output coupler comprising:
  - a pair of 1:1 turns ratio transformers, one of which has four terminals *a*, *b*, *e* and *f*, of which *a-b* and *e-f* constitute a coupled pair, and the other of which has four terminals *c*, *d*, *g* and *h*, of which *c-d* and *g-h* constitute a coupled pair;

means for connecting terminal *a* of said one transformer to terminal *c* of said other terminal, forming port 1 of said coupler;

means for connecting terminal *b* of said one transformer to terminal *d* of said other transformer forming port 2 of said coupler;

means for connecting terminal *f* of said one transformer to terminal *g* of said other transformer;

terminal *e* of said one transformer constituting coupler port 3;

terminal *h* of said other transformer being grounded;

and a terminating impedance connected between the junction of terminals *g* and *f* and said second coupler port;

a first signal amplifying stage connected between port 2 of said input coupler and port 3 of said output coupler;

and a second signal amplifying stage connected between port 3 of said input coupler and port 2 of said output coupler.

* * * * *